US008447977B2

(12) United States Patent
Slick et al.

(10) Patent No.: US 8,447,977 B2
(45) Date of Patent: May 21, 2013

(54) AUTHENTICATING A DEVICE WITH A SERVER OVER A NETWORK (75) Inventors: Royce Slick, Mission Viejo, CA (US); Don Matsubayashi, Tustin, CA (US); Kevin Piazza, Santa Ana, CA (US); Dariusz Dusberger, Irvine, CA (US); Neil Iwamoto, Mission Viejo, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 960 days.

(21) Appl. No.: 12/331,287

(22) Filed: Dec. 9, 2008

(65) Prior Publication Data

US 2010/0146275 A1    Jun. 10, 2010

(51) Int. Cl.
*H04L 9/32* (2006.01)
*G06F 7/04* (2006.01)
*G06F 17/30* (2006.01)

(52) U.S. Cl.
USPC .................................. 713/169; 726/9; 726/20

(58) Field of Classification Search
None
See application file for complete search history.

(56) References Cited

U.S. PATENT DOCUMENTS

| | | | |
|---|---|---|---|
| 5,732,137 A | | 3/1998 | Aziz |
| 5,970,147 A | | 10/1999 | Davis |
| 6,006,332 A | | 12/1999 | Rabne et al. |
| 6,065,120 A | * | 5/2000 | Laursen et al. ................... 726/5 |
| 6,161,139 A | * | 12/2000 | Win et al. ........................ 709/225 |
| 6,647,304 B2 | * | 11/2003 | Tsukishima et al. ............ 700/95 |
| 6,754,815 B1 | | 6/2004 | Ellison et al. |
| 6,769,058 B1 | | 7/2004 | Ellison et al. |
| 7,089,208 B1 | | 8/2006 | Levchin et al. |
| 7,092,370 B2 | | 8/2006 | Jiang et al. |
| 7,167,466 B2 | * | 1/2007 | Chowdhury et al. ......... 370/349 |
| 7,181,620 B1 | | 2/2007 | Hur |
| 7,219,154 B2 | | 5/2007 | Blakley, III et al. |
| 7,263,205 B2 | | 8/2007 | Lev |
| 7,284,233 B2 | | 10/2007 | Sengodan |
| 7,290,249 B2 | | 10/2007 | Sengodan |
| 7,293,262 B2 | | 11/2007 | Sengodan |
| 7,302,634 B2 | | 11/2007 | Lucovsky et al. |
| 7,305,254 B2 | | 12/2007 | Findikli |
| 7,308,261 B2 | | 12/2007 | Henderson et al. |
| 7,308,597 B2 | | 12/2007 | Bhat et al. |
| 7,310,684 B2 | * | 12/2007 | Patrick et al. ................. 709/238 |
| 7,313,690 B2 | | 12/2007 | Miller |
| 7,313,825 B2 | | 12/2007 | Redlich et al. |
| 7,316,027 B2 | | 1/2008 | Burch et al. |

(Continued)

OTHER PUBLICATIONS

International Search Report and Written Opinion dated Dec. 1, 2009 in counterpart PCT/US2009/005431.

(Continued)

*Primary Examiner* — William Powers
(74) *Attorney, Agent, or Firm* — Fitzpatrick, Cella, Harper & Scinto (57) ABSTRACT The authentication of a device with a server over a network includes authenticating, by the device, the server so as to establish a secure connection with the server. The device communicates identification information of the device to the server, wherein the identification information uniquely identifies the device to the server. The server determines the credibility of the device using the identification information communicated by the device. In a case where the server determines that the device is credible, the server creates a first authentication token for the device, stores the first authentication token, and transfers the first authentication token to the device using the secure connection, and the device stores the first authentication token. The server authenticates the device using the first authentication token.

28 Claims, 6 Drawing Sheets

U.S. PATENT DOCUMENTS

| | | | |
|---|---|---|---|
| 7,316,030 B2 | 1/2008 | Audebert et al. | |
| 7,321,969 B2 | 1/2008 | Schoen et al. | |
| 7,322,047 B2 | 1/2008 | Redlich et al. | |
| 7,325,128 B2 | 1/2008 | Wood et al. | |
| 7,325,134 B2 * | 1/2008 | Fascenda | 713/169 |
| 7,330,971 B1 | 2/2008 | Kukreja et al. | |
| 7,340,438 B2 | 3/2008 | Nordman et al. | |
| 7,340,481 B1 | 3/2008 | Baer et al. | |
| 7,346,844 B1 | 3/2008 | Baer et al. | |
| 7,346,930 B1 | 3/2008 | Boydstun et al. | 726/29 |
| 7,349,913 B2 | 3/2008 | Clark et al. | |
| 7,349,987 B2 | 3/2008 | Redlich et al. | |
| 7,350,201 B2 | 3/2008 | Ferri et al. | |
| 7,356,046 B2 | 4/2008 | Harley, Jr. | |
| 7,356,389 B2 | 4/2008 | Holst et al. | |
| 7,363,486 B2 | 4/2008 | Audebert et al. | |
| 7,363,487 B2 | 4/2008 | Venkataramappa et al. | |
| 7,366,892 B2 | 4/2008 | Spaur et al. | |
| 7,369,677 B2 | 5/2008 | Petrovic et al. | |
| 7,370,091 B1 | 5/2008 | Slaughter et al. | |
| 7,376,836 B2 | 5/2008 | Graves et al. | |
| 7,376,900 B2 | 5/2008 | Guido et al. | |
| 7,389,393 B1 | 6/2008 | Karr et al. | |
| 7,391,865 B2 | 6/2008 | Orsini et al. | |
| 7,395,243 B1 | 7/2008 | Zielke et al. | |
| 7,395,246 B2 | 7/2008 | Brickell et al. | |
| 7,395,333 B1 | 7/2008 | Saulpaugh et al. | |
| 7,398,261 B2 | 7/2008 | Spivack et al. | |
| 7,398,389 B2 | 7/2008 | Teal et al. | |
| 7,398,533 B1 | 7/2008 | Slaughter et al. | |
| 7,401,036 B2 | 7/2008 | Vande Pol | |
| 7,409,569 B2 | 8/2008 | Illowsky et al. | |
| 7,412,518 B1 | 8/2008 | Duigou et al. | |
| 7,412,598 B1 | 8/2008 | Gleichauf | |
| 7,415,617 B2 | 8/2008 | Ginter et al. | |
| 7,415,725 B2 | 8/2008 | Henneberry et al. | |
| 7,418,474 B2 | 8/2008 | Schwab | |
| 7,418,596 B1 | 8/2008 | Carroll et al. | |
| 7,421,155 B2 | 9/2008 | King et al. | |
| 7,424,438 B2 | 9/2008 | Vianello | |
| 7,426,721 B1 | 9/2008 | Saulpaugh et al. | |
| 7,428,493 B2 | 9/2008 | Shkedi | |
| 7,428,546 B2 | 9/2008 | Nori et al. | |
| 7,430,670 B1 | 9/2008 | Horning et al. | |
| 7,797,532 B2 * | 9/2010 | Miura et al. | 713/156 |
| 2003/0200184 A1 | 10/2003 | Dominguez et al. | 705/78 |
| 2005/0097362 A1 | 5/2005 | Winget et al. | |
| 2006/0090197 A1 * | 4/2006 | Hermann et al. | 726/5 |
| 2006/0156385 A1 | 7/2006 | Chiviendacz et al. | 726/2 |
| 2006/0171537 A1 | 8/2006 | Enright | |
| 2006/0230165 A1 | 10/2006 | Zimmer et al. | |
| 2007/0143831 A1 | 6/2007 | Pearson et al. | 726/5 |
| 2007/0150420 A1 | 6/2007 | Iwamoto et al. | |
| 2007/0180449 A1 | 8/2007 | Croft et al. | 718/1 |
| 2007/0289002 A1 | 12/2007 | van der Horst et al. | 726/9 |
| 2007/0300058 A1 | 12/2007 | Takala et al. | |
| 2008/0028458 A1 | 1/2008 | Masuhiro et al. | 726/14 |

OTHER PUBLICATIONS

"The next evolution in network authentication and security", U.are.U Pro, 2001.
"Oath Reference Architecture, Release 2.0", www.openauthentication.org, 2007.

* cited by examiner

AUTHENTICATING A DEVICE WITH A SERVER OVER A NETWORK

BACKGROUND OF THE INVENTION

1. Field of the Invention

The invention relates to the field of authenticating devices, and more particularly relates to authenticating a device with a server over a network.

2. Description of the Related Art

Various systems are known for confirming the identity of a networked device, when establishing communication between that device and another networked device or computer.

For example, in one conventional system, an X.509 certificate may be installed in the device at the time of manufacturing under the control of a trusted administrator. The certificate can be used within a Public Key Infrastructure (PKI), such that other devices can securely identify the device when communicating with the device over a network.

Other conventional systems may not use PKI. For example, these systems may use symmetric keys to authenticate a device. Using this approach, the symmetric keys can be installed by a trusted administrator and also stored in a trusted repository, such that the trusted repository can participate in the authentication and other aspects of securely accessing the device.

However, in conventional systems, there is typically a requirement to install the security credentials used to strongly authenticate the device. This requirement can create a burden in the manufacturing process for the device. For example, this burden can be experienced by the manufacturing operation, service personnel, system administrators, or end-users, depending on the method of installation of the authentication credentials.

Thus, there is a need for systems and methods with improved authentication of a networked device, such that the identity of the networked device may be firmly established in an efficient manner.

SUMMARY OF THE INVENTION

Disclosed embodiments describe systems and methods for authenticating a device with a server over a network. Certain disclosed embodiments provide that the device authenticates the server so as to establish a secure connection with the server, and communicates identification information of the device to the server. The identification information uniquely identifies the device to the server. The server determines the credibility of the device using the identification information communicated by the device. In a case where the server determines that the device is credible, the server creates a first authentication token for the device and transfers the first authentication token to the device using the secure connection. The server authenticates the device using the first authentication token.

In one aspect of the disclosure, a method of authenticating a device with a server over a network is provided. The device authenticates the server so as to establish a secure connection with the server, and communicates identification information of the device to the server, wherein the identification information uniquely identifies the device to the server. The server determines the credibility of the device using the identification information communicated by the device. In a case where the server determines that the device is credible, the server creates a first authentication token for the device, stores the first authentication token, and transfers the first authentication token to the device using the secure connection. The device stores the first authentication token. The server authenticates the device using the first authentication token.

In a further aspect of the disclosure, a computer-readable memory medium on which is stored computer-executable process steps for causing a computer to authenticate a device with a server over a network is provided. The process steps include the device authenticating the server so as to establish a secure connection with the server, and communicating identification information of the device to the server, wherein the identification information uniquely identifies the device to the server. The process steps further include the server determining the credibility of the device using the identification information communicated by the device. In addition, the process steps include, in a case where the server determines that the device is credible, the server creating a first authentication token for the device, stores the first authentication token, and transferring the first authentication token to the device using the secure connection. The process steps further include the device storing the first authentication token, and the server authenticating the device using the first authentication token.

In yet a further aspect of the disclosure, a device for authentication by a server over a network is provided. The device includes a computer-readable memory constructed to store computer-executable process steps, and a processor constructed to execute the computer-executable process steps stored in the memory. The computer-executable process steps include authenticating the server so as to establish a secure connection with the server, and communicating identification information of the device to the server, wherein the identification information uniquely identifies the device to the server. The computer-executable process steps further include receiving a first authentication token from the server and storing the first authentication token, in a case where the server determines that the device is credible based on the identification information. The device is authenticated by the server using the first authentication token.

In yet a further aspect of the disclosure, a server for authenticating a device over a network is provided. The server includes a computer-readable memory constructed to store computer-executable process steps, and a processor constructed to execute the computer-executable process steps stored in the memory. The computer-executable process steps include being authenticated by the device, so as to establish a secure connection between the device and the server, and receiving identification information from the device, wherein the identification information uniquely identifies the device to the server. The computer-executable process steps further include determining the credibility of the device using the identification information. The computer-executable process steps further include, in a case where it is determined that the device is credible, creating a first authentication token for the device, storing the first authentication token, and transferring the first authentication token to the device using the secure connection. The computer-executable process steps further include authenticating the device using the first authentication token.

The credibility of the device can be determined by the server accessing a database to determine whether the identification information supplied by the device reasonably and credibly identifies the device. The identification information can include at least one of a device model number, a firmware revision, a Media Access Control (MAC) address, and a device serial number. The authenticating the device can be based on a challenge-response mechanism which employs the first authentication token to authenticate the device with the server. The secure connection can be a Secure Sockets Layer (SSL) connection.

The authenticating the server can include the server creating a second authentication token, storing the second authentication token, transferring the second authentication token to the device using the secure connection, and the device storing the second authentication token, wherein the server is authenticated using the second authentication token.

A user can provide a password to the server out-of-band, prior to the device authenticating the server. The user can provide the password to the server via a browser or other web application.

The device can determine which server to authenticate, prior to authenticating the server. The server can be determined from a predetermined, initial configuration of the device. The server can also be determined from a manual configuration of an administrator. In addition, the server can be determined by connecting to a primary server, which in turn selects the server from one or more secondary servers, and which redirects the device to the selected secondary server.

This brief summary has been provided so that the nature of this disclosure may be understood quickly. A more complete understanding can be obtained by reference to the following detailed description and to the attached drawings.

DETAILED DESCRIPTION OF THE INVENTION

Figure 1:
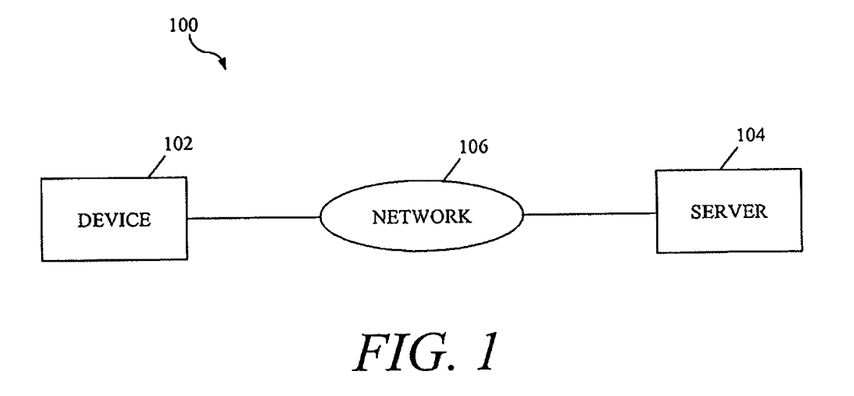
FIG. 1 is a block diagram illustrating an example of a network in which a device can be authenticated with a server.

FIG. 1 is a block diagram illustrating an example of a network in which a device can be authenticated with a server. Although the following description focuses primarily on the networked computing environment 100 shown in FIG. 1, various alternative systems may be used.

As shown in FIG. 1, the networked computing environment 100 can comprise a network 106 which connects device 102 and server 104. Network 106 may be any type of network, such as a local area network (LAN), a wide area network (WAN), or the Internet. For example, network 106 can be an Ethernet network medium consisting of a bus-type physical architecture.

Device 102 is a type of networked device. For example, device 102 can be a computer, printer, scanner, digital camera, or any other type of networked device. Device 102 can include the ability to perform secure communications with other devices (not shown) connected to network 106, as well as to server 104.

As can be seen in FIG. 1, server 104 is also connected to network 106. Among other things, server 104 may manage and provide for authenticating device 102 over network 106.

As will be described in greater detail below, a user (not shown) can initiate authentication of device 102 with server 104 over network 106.

Figure 2:
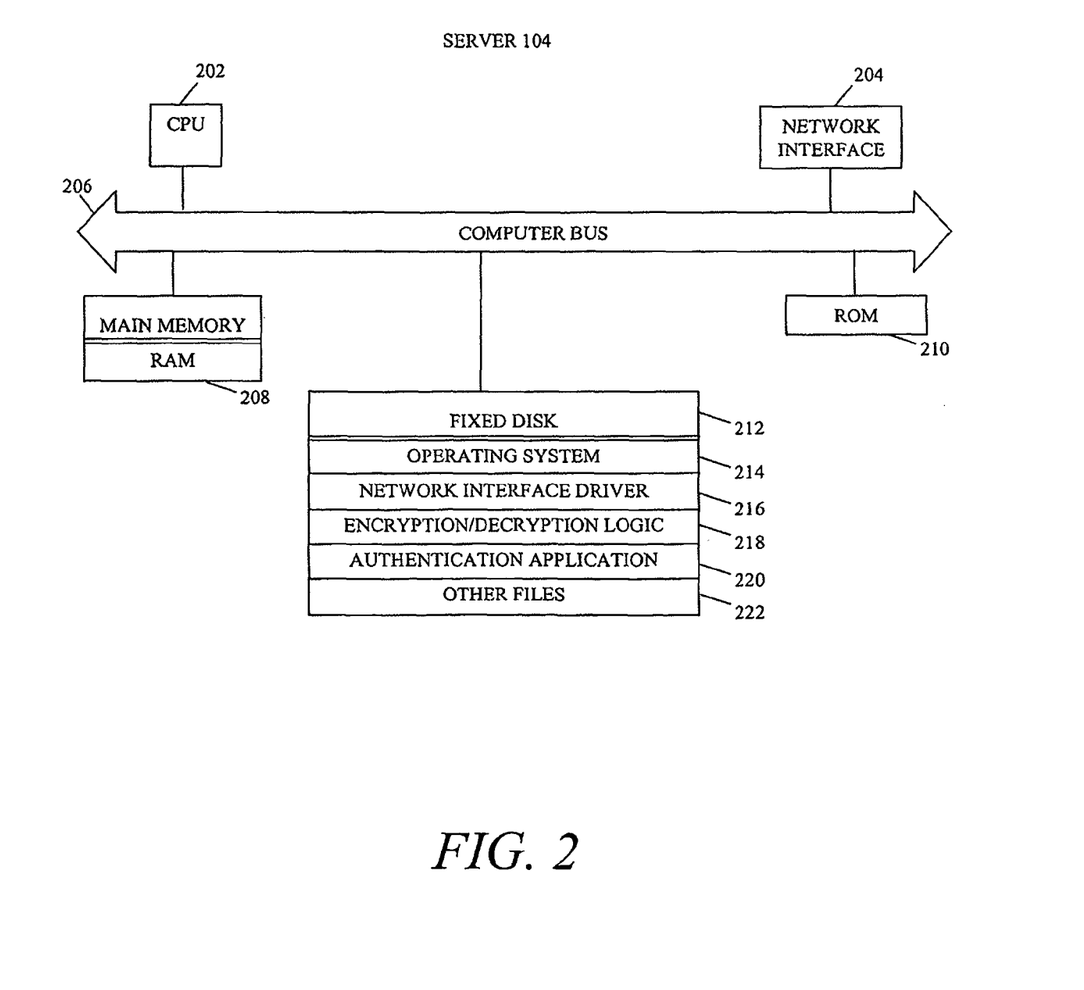
FIG. 2 is a block diagram depicting an example of an internal architecture of a server.

FIG. 2 is a block diagram depicting an example of an internal architecture of a server (e.g., server 104). Server 104 can include a central processing unit (CPU) 202 such as a programmable microprocessor which is interfaced to computer bus 206. A network interface 204 for interfacing to network 106 can also be coupled to computer bus 206. In addition, random access memory (RAM) 208, fixed disk 212, and read-only (ROM) 210 can be coupled to computer bus 206. RAM 208 can interface to computer bus 206 to provide CPU 202 with access to memory storage, thereby acting as the main run-time memory for CPU 202. In particular, when executing stored program instruction sequences, CPU 202 can load those instruction sequences from fixed disk 212 (or other memory media) into RAM 208 and can execute those stored program instruction sequences out of RAM 208. It should also be recognized that standard disk-swapping techniques allow segments of memory to be swapped to and from RAM 208 and fixed disk 212. ROM 210 can store invariant instruction sequences, such as start-up instruction sequences for CPU 202 or basic input/output operating system (BIOS) sequences for the operation of peripheral devices which may be attached to server 104 (not shown).

Fixed disk 212 is one example of a computer-readable medium that stores program instruction sequences executable by CPU 202. In server 104, the program instruction sequences may include operating system 214, network interface driver 216, encryption/decryption logic 218, authentication application 220, and other files 222. Operating system 214 can be an operating system such as Windows (e.g., Windows NT, XP or Vista), UNIX, Novell Netware or other such server operating systems. Network interface driver 216 can be a hardware driver application utilized to drive network interface 204 for interfacing server 104 to network 106. Encryption/decryption logic 218 can provide security functionality for server 104 to encrypt transmissions utilizing, for example, encryption keys, and provides functionality for decrypting received transmissions. Other files 222 can contain other files or programs necessary to operate server 104 and/or to provide additional functionality to server 104.

Furthermore, authentication application 220 can be a software application which provides the functionality for authenticating a device (e.g., device 102) over a network (e.g., network 106). Specifically, as will be described in greater detail below, authentication application 220 can provide functionality for being authenticated by device 102, so as to establish a secure connection between device 102 and server 104, and receiving identification information from device 102, wherein the identification information uniquely identifies device 102 to server 104. Authentication application 220 can provide further functionality for determining the credibility of device 102 using the identification information. In addition, authentication application 220 can provide functionality for, in a case where it is determined that device 102 is credible, creating a first authentication token for device 102, storing the first authentication token, and transferring the first authentication token to device 102 using the secure connection. Device 102 can be authenticated by server 104 using the first authentication token.

Figure 3:
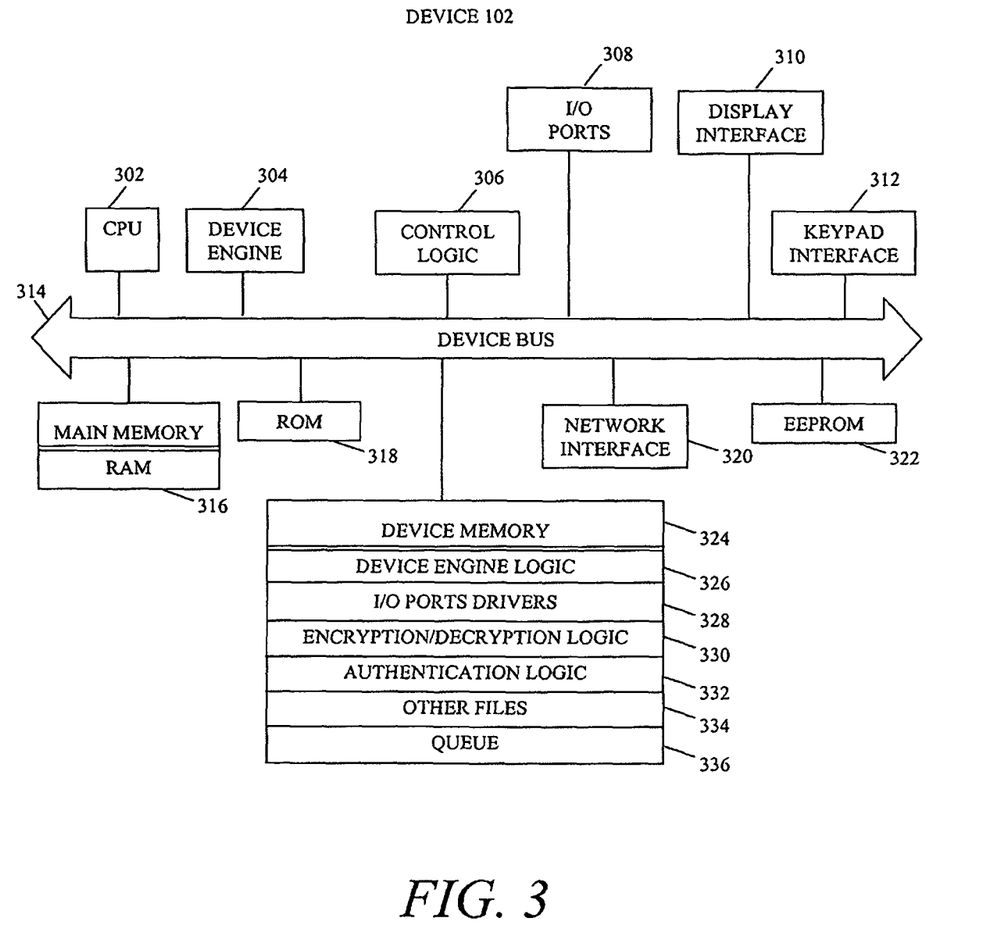
FIG. 3 is a block diagram depicting an example of an internal architecture of a device.

FIG. 3 is a block diagram depicting an example of an internal architecture of a device (e.g., device 102). As noted above, device 102 can be a computer, printer, scanner, digital camera, or any other type of networked device. Device 102 can include a central processing unit (CPU) 302 such as a programmable microprocessor which can interface to device bus 314. Control logic 306, which can be utilized to control device engine 304 of device 102, I/O ports 308 which can be used to communicate with various input/output devices of device 102 (not shown), network interface 320 which can be utilized to interface device 102 to network 106, display interface 310 which can interface to a display (not shown) associated with device 102, and keypad interface 312 which interfaces to a keypad (or keyboard) associated with device 102 can also be coupled to device bus 314.

EEPROM 322, which can be used for containing non-volatile program instructions, random access memory (RAM) 316, device memory 324 and read-only memory (ROM) 318 can also be coupled to device bus 314. RAM 316 can interface to device bus 314 to provide CPU 302 with access to memory storage, thereby acting as the main run-time memory for CPU 302. In particular, when executing stored program instruction sequences, CPU 302 can load those instruction sequences from device memory 324 (or other memory media) into RAM 316 and can execute those stored program instruction sequences out of RAM 316. ROM 318 can store invariant instruction sequences, such as start-up instruction sequences for CPU 302 or BIOS sequences for the operation of various peripheral devices of device 102 (not shown).

Device memory 324 is one example of a computer-readable medium that can store program instruction sequences executable by CPU 302 so as to constitute device engine logic 326, I/O port drivers 328, encryption/decryption logic 330, authentication logic 332, other files 334 and queue 336. Device engine logic 326 can control and drive device engine 304 of device 102 so as to perform a function (e.g., print, capture, scan) for data associated with device 102. For example, such data can be sent to or received from device 102 over network 106. I/O port drivers 328 can be utilized to drive input and output devices such as a barcode scanner (not shown) connected through I/O ports 308. Other files 334 can include files and/or programs for the operation of device 102.

Furthermore, authentication logic 332 can provide functionality for authenticating device 102 over a network (e.g., network 106). Specifically, as will be described in greater detail below, authentication logic 332 can provide functionality for authenticating a server (e.g., server 104) so as to establish a secure connection with server 104, and communicating identification information of device 102 to server 104, wherein the identification information uniquely identifies device 102 to server 104. Authentication logic 332 can further provide functionality for receiving a first authentication token from server 104, in a case where server 104 determines that device 102 is credible based on the identification information and creates the first authentication token, and storing the first authentication token. Authentication logic 332 can further provide functionality for authenticating device 102 using the first authentication token.

Figure 4:
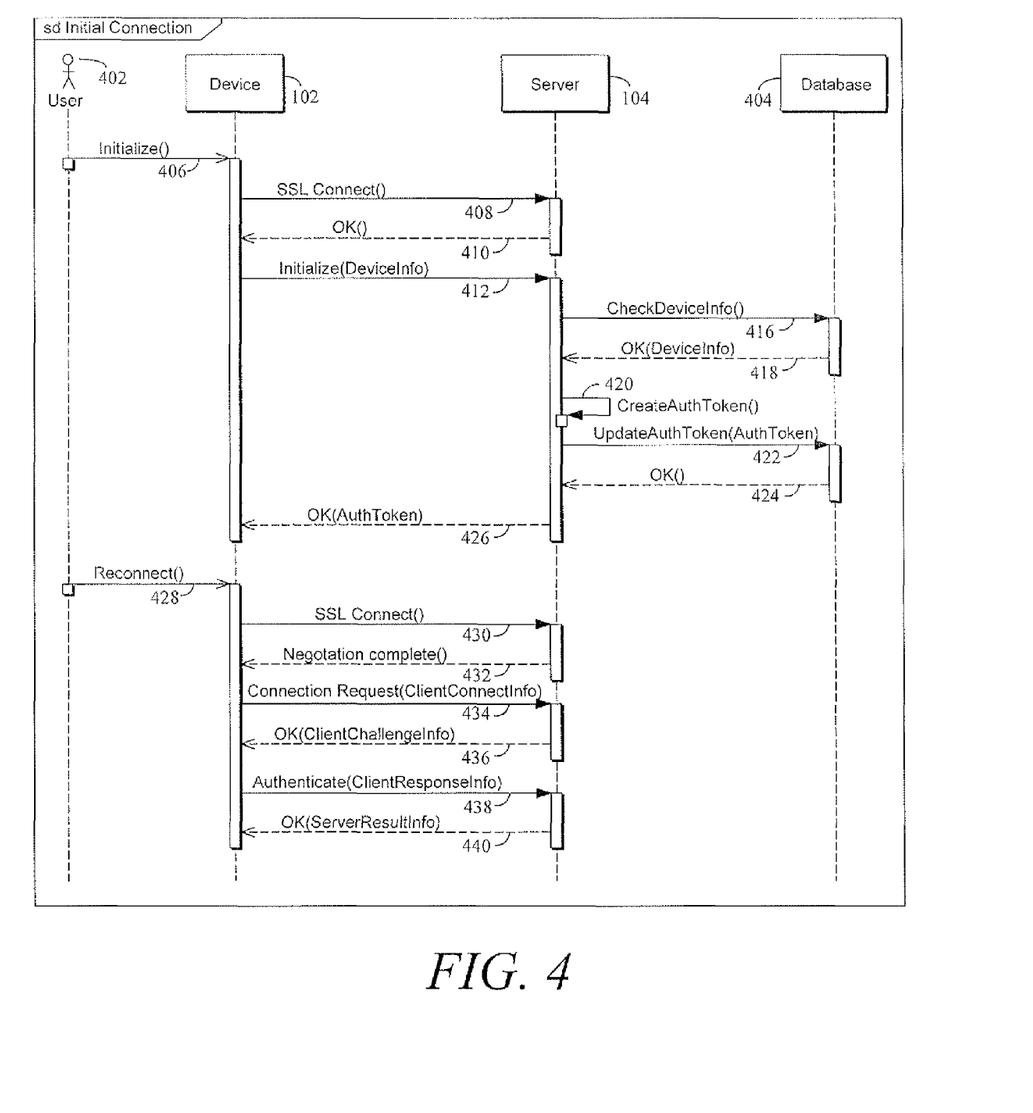
FIG. 4 is a sequence diagram illustrating an example of sequence steps for authenticating a device with a server over a network.
Figure 5:
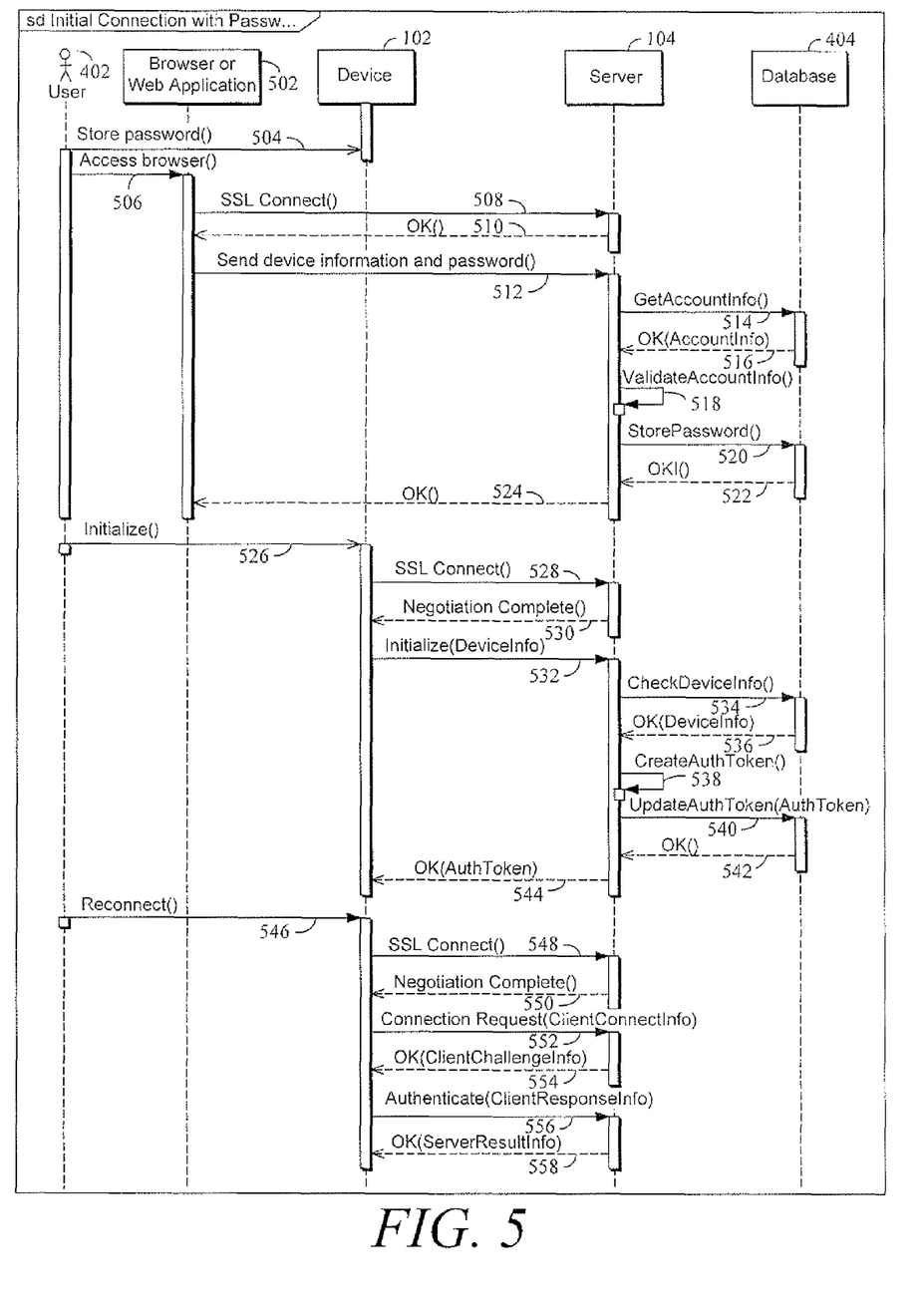
FIG. 5 is a sequence diagram illustrating another example of sequence steps for authenticating a device with a server over a network.

FIGS. 4 and 5 are sequence diagrams illustrating examples of sequence steps for authenticating a device with a server over a network. The examples described in FIGS. 4 and 5 are seen to correspond with improved authentication of a device with a server over a network. The examples of FIGS. 4 and 5 provide at least for generating a new authentication token and provisioning it to device 102 securely and automatically. As such, a separate manufacturing process step is not required. In addition, intervention by a service technician, an administrator, or an end-user is not required.

To create a unique authentication token, which will be described in greater detail below, device 102 can be manufactured with features that allow it to initiate an SSL connection securely, without the additional installation of credentials in a manufacturing process step, by a service technician, an administrator, or an end-user. Although FIGS. 4 and 5 depict use of an SSL connection, it should be noted that other types of protocols for establishing secure connections can be used.

Further, device 102 can be manufactured to include logic that can initiate an SSL (or other secure) connection, and at least one root validation certificate. The root validation certificate can be used to authenticate a server (e.g., server 104) possessing an x.509 server certificate that is signed by the certificate authority that issued the root validation certificate possessed by device 102. It should be noted that the root validation certificate can be duplicated in all devices (e.g., device 102) during the manufacturing process, as it is not unique to each device. This can, therefore, be accomplished with typically no additional burden on the manufacturing process.

In a further aspect, server 104 can be contacted by a user engaged in the setup of device 102, the user can indicate to server 104 that a provisioning operation is required, and the provisioning operation can be conducted between device 102 and server 104. The success of the provisioning operation can be dependent upon the proximity in time of the user's indication to server 104 of the need for a provisioning operation and the actual initiation of the provisioning operation.

With reference to FIG. 4, the sequence diagram illustrates the initial connection, establishment of a shared token, and a subsequent connection with device authentication. At sequence step 406, a user 402 can initiate authentication of a device (e.g., device 102) with a server (e.g., server 104) over a network (e.g., 106). At sequence steps 408 and 410, device 102 can initiate an SSL connection with server 104. Although FIG. 4 depicts the connection as an SSL connection, other types of protocols for establishing secure connections can be used.

Server 104 can be a trusted provisioning server. The choice of a trusted provisioning server can be predetermined in the initial configuration of device 102, so as to facilitate the process automatically. The choice of a trusted provisioning server can also be configured manually by an administrator (e.g., user 402). In addition, device 102 can first connect to a primary server (not shown), which then selects from one or more provisioning servers that will be used to complete the SSL connect process. Once a provisioning server is selected, the primary server can redirect device 102 to the selected server (e.g., server 104) to complete the SSL connect process. For example, such selection of a provisioning server from a primary server can allow the SSL connect process to be completed using a server that is geographically proximate to device 102.

During the negotiation phase of the SSL connection, device 102 can authenticate server 104. As device 102 has no pre-existing security credentials, server 104 typically cannot securely authenticate device 102 at this stage, with an exception described below with reference to FIG. 5. When device 102 authenticates server 104, a secure communication channel is established between device 102 and server 104. At this point, further communication between device 102 and server 104 is secure against eavesdropping or modification by other network endpoints.

At sequence step 412, device 102 can communicate identification information that uniquely identifies device 102 to server 104. For example, this identification information can include any of device 102 model number, the firmware revision, the Media Access Control (MAC) address, the device serial number, and other information that, when combined, uniquely describes device 102. As device 102 has not been strongly authenticated by server 106, there is the possibility that a rogue device or computer may supply spoofed (e.g., not credible and/or unreliable) information.

As such, server 104 can evaluate the unique identification information that it received from device 102. In evaluating the received information, server 104 can consult a database 404 or use other means to determine whether the identification information supplied by device 102 is reasonable and credible (sequence steps 416 and 418). If server 104 determines that the received identification information is not reasonable and credible, it may reject the attempt by device 102 to generate a new authentication token.

If server 104 determines that the identification information supplied by device 102 is reasonable and credible, server 104 can create an authentication token for device 102 (sequence step 420). Server 104 can transfer the authentication token securely to device 102, using the existing SSL connection (sequence step 426). Server 104 can also store the authentication token in database 404 for future reference (sequence steps 422 and 424).

Additional measures may be taken to secure the new authentication token, by encrypting it to ensure its security while it is stored in database 404. Further, the authentication token may be implemented in a variety of ways. For example, the authentication token can simply be a random value that is associated with device 102 as, for example, a key. In another example, the authentication token can be an X.509 certificate.

Device 102 can receive the authentication token (sequence step 426) and store it locally for future use (not shown). The token can be stored in non-volatile storage, such as in flash memory or on a disk. Further, device 102 can take additional steps to ensure that the token is stored securely, such as encrypting it prior to storage or storing it in a hardened hardware module, such as a smart chip.

Further for sequence step 426, device 102 can acknowledge successful completion of the token generation and storage process, such that both device 102 and server 104 regard the process as complete. The secure connection can be terminated, and the authentication token can be used by device 102 to authenticate device 102 with server 104.

In this regard, when a reconnect is issued by user 402 (sequence step 428), the same authentication token can be used for establishing connections. As can be seen in FIG. 4, device 102 can initiate an SSL (or other protocol) connection to server 104 (sequence steps 430 and 432). If SSL is used, device 102 can authenticate server 104 via the SSL negotiation.

Further, device 102 can request a connection to server 104 (sequence steps 434 and 436). An authentication process can occur between device 102 and server 104 (sequence steps 438 and 440) using the authentication token, where the authentication token is used to authenticate device 102. For example, a challenge-response mechanism employing the authentication token may be used to authenticate device 102 with server 104. The challenge-response algorithm may be one of various algorithms that are well known in the art or may be any other challenge response algorithm. The OATH Challenge Response Algorithm (OCRA) is an example of such an algorithm which may be utilized to authenticate device 102 with server 104.

Although not depicted in FIG. 4, a second authentication token can be created by server 104, transferred to device 102 and stored by device 102 and server 104, in a manner similar to the original authentication token. This second authentication token can be used to authenticate server 104 (or another server in the same infrastructure) to device 102. For example, generating the second authentication token for server 104 can be useful in cases where the use of SSL (or another protocol) to authenticate server 104 is inconvenient or unavailable during communication sessions. Similar to the original authentication token, the second authentication token can be based on a random value.

FIG. 5 is a sequence diagram illustrating another example of sequence steps for authenticating a device with a server over a network. As noted above, device 102 typically has no pre-existing security credentials during the negotiation phase of the SSL connection, and server 104 typically cannot securely authenticate device 102 at this phase. However, FIG. 5 depicts an example of how server 104 can securely authenticate device 102 during the provisioning process, by use of an out-of-band password.

The out-of-band password can be entered into device 102 prior to the provisioning operation, the password can be provided to server 104 prior to the provisioning operation, and the password can be associated with device 102 and stored by server 104 (e.g., in database 404). The password can be used to authenticate device 102 during the provisioning process. Further, the password can be used during the authentication operation in a new session, subsequent to the provisioning process.

Similar to the sequence steps of FIG. 4, the sequence steps of FIG. 5 includes an initial connection by device 102 to server 104 (sequence steps 526 to 530), establishment of an authentication token which is shared (sequence steps 532 to 544), and a subsequent connection that employs device authentication (sequence steps 546 to 558). However, in addition to the sequence steps depicted in FIG. 4, FIG. 5 further illustrates password entry steps (sequence steps 504 to 524), which relate to the use of an out-of-band password.

More specifically, the authentication of device 102 by server 104 can be supplemented with an out-of band connection to server 104, where user 402 (e.g., an administrator or other user) can use a browser or other web application 502 (hereinafter browser 502) to provide a password to server 104 out-of-band, prior to initial authentication. The password can allow device 102 to be linked to a specific account owner and to the security of the authentication process of device 102, while also permitting the authentication of device 102 (or user 402 of device 102) during the initial provisioning operation.

As can be seen in FIG. 5, the password entry steps can include user 402 storing a password on device 102 (sequence step 504), user 402 accessing browser 502 (sequence step 506), browser 502 initiating an SSL connection to server 104 (sequence steps 508 and 510), and browser 502 sending and confirming device and password information to server 104 (sequence steps 512 and 524). When the device and password information are received by server 104, server 104 can get account information from database 404 (sequence steps 514 and 516). Server 104 can further validate the account based on the device and password information (sequence step 518), and server 104 can store the password (sequence steps 520 and 522).

It should also be noted that the authentication token may be combined with the out-of-band password and other factors (e.g., real-time clock value, counter, etc.), to enhance the security of the authentication process.

Accordingly, the examples of sequence steps in FIGS. 4 and 5 of authenticating device 102 with server 104 are seen to provide at least for generating a new authentication token and provisioning it to device 102 securely and automatically. As such, a separate manufacturing process step is not required. In addition, intervention by a service technician, an administrator, or an end-user is not required.

Figure 6:
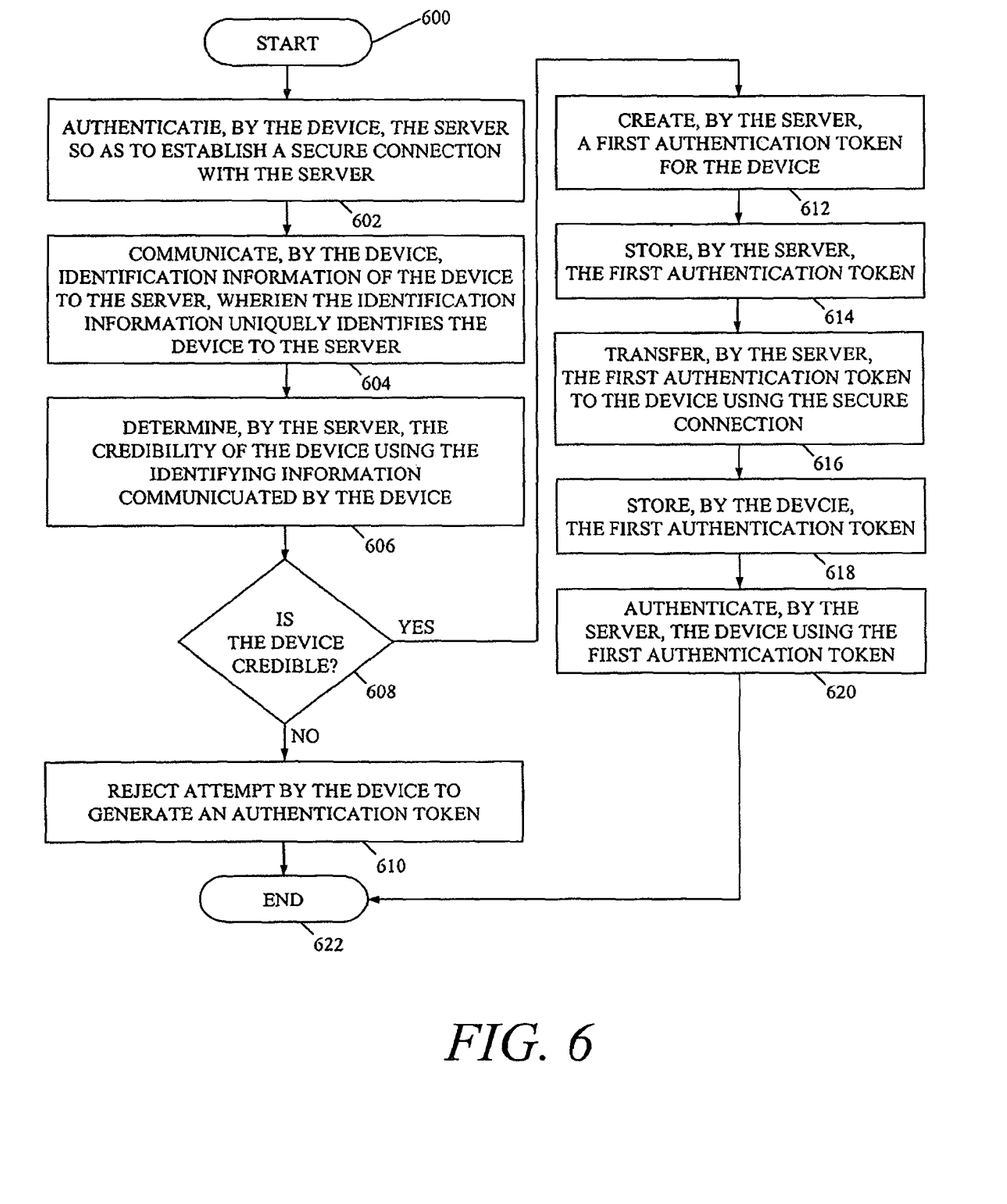
FIG. 6 is a flowchart illustrating an example for authenticating a device with a server over a network.

FIG. 6 is a flowchart illustrating an example for authenticating a device with a server over a network. Following start bubble 600, the device authenticates the server so as to establish a secure connection with the server (block 602). The device communicates identification information of the device to the server, wherein the identification information uniquely identifies the device to the server (block 604). The server determines the credibility of the device using the identification information communicated by the device (block 606). At decision diamond 608, in a case where the server determines that the device is credible, the server creates a first authentication token for the device (block 612), stores the first authentication token (block 614), and transfers the first authentication token to the device using the secure connection (block 616). Further, the device stores the first authentication token (block 618). In addition, the server authenticates the device using the first authentication token. At decision diamond 608, in a case where the device is not credible, the server may reject the attempt by the device to generate an authentication token (block 610). The process then ends (end bubble 622).

The invention has been described above with respect to particular illustrative embodiments. It is understood that the invention is not limited to the above-described embodiments and that various changes and modifications may be made by those skilled in the relevant art without departing from the spirit and scope of the invention.

What is claimed is:

1. A method of authenticating a device with a server over a network, the method comprising the steps of:
   establishing, by the device, a secure connection with the server;
   communicating, by the device, identification information of the device to the server, wherein the identification information uniquely identifies the device to the server and is pre-stored in the device;
   determining, by the server, the credibility of the device using the identification information communicated by the device; and
   in a case where the server determines that the device is credible:
   creating, by the server, a first authentication token for the device, the first authentication token indicating that the device is credible;
   storing, by the server, the first authentication token;
   transferring, by the server, the first authentication token to the device using the secure connection; and
   storing, by the device, the first authentication token;
   wherein the method further comprises the steps of:
   establishing, by the device, a secure re-connection with the server; and
   authenticating, by the server and over the secure re-connection, the device using the first authentication token stored by the device.

2. A method according to claim 1, wherein the determining the credibility of the device comprises accessing, by the server, a database to determine whether the identification information supplied by the device reasonably and credibly identifies the device.

3. A method according to claim 1, wherein the identification information comprises at least one of a device model number, a firmware revision, a Media Access Control (MAC) address, and a device serial number.

4. A method according to claim 1, wherein the authenticating the device is based on a challenge response mechanism which employs the first authentication token to authenticate the device with the server.

5. A method according to claim 1, wherein the secure connection is a Secure Sockets Layer (SSL) connection.

6. A method according to claim 1, wherein the authenticating the server comprises:
   creating, by the server, a second authentication token;
   storing, by the server, the second authentication token;
   transferring, by the server, the second authentication token to the device using the secure connection; and
   storing, by the device, the second authentication token,
   wherein the server is authenticated using the second authentication token.

7. A method according to claim 1, further comprising:
   providing, by a user, a password to the server out of band, prior to the device authenticating the server.

8. A method according to claim 7, wherein the user provides the password to the server via a browser or other web application.

9. A method according to claim 1, further comprising:
   determining, by the device, which server to authenticate, prior to the device authenticating the server.

10. A method according to claim 9, wherein the server is determined from a predetermined, initial configuration of the device.

11. A method according to claim 9, wherein the server is determined from a manual configuration of an administrator.

12. A method according to claim 9, wherein the server is determined by connecting to a primary server, which in turn selects the server from one or more secondary servers, and which redirects the device to the selected secondary server.

13. A method according to claim 1, wherein the identification information uniquely identifies the device to the server and includes a combination of plural identification data pre-stored in the device including device model number, a firmware revision, a Media Access Control (MAC) address, and a device serial number.

14. A non-transitory computer readable memory medium on which is stored computer executable process steps for causing a computer to authenticate a device with a server over a network, the process steps comprising:
   establishing, by the device, a secure connection with the server;
   communicating, by the device, identification information of the device to the server, wherein the identification information uniquely identifies the device to the server and is pre-stored in the device;
   determining, by the server, the credibility of the device using the identification information communicated by the device; and
   in a case where the server determines that the device is credible:
   creating, by the server, a first authentication token for the device, the first authentication token indicating that the device is credible;
   storing, by the server, the first authentication token;
   transferring, by the server, the first authentication token to the device using the secure connection; and
   storing, by the device, the first authentication token;
   wherein the process steps further comprise:
   establishing, by the device, a secure re-connection with the server; and
   authenticating, by the server and over the secure re-connection, the device using the first authentication token stored by the devices.

15. A non-transitory computer readable memory medium according to claim 14, wherein the determining the credibility of the device comprises accessing, by the server, a database to determine whether the identification information supplied by the device reasonably and credibly identifies the device.

16. A non-transitory computer readable memory medium according to claim 14, wherein the identification information comprises at least one of a device model number, a firmware revision, a MAC address, and a device serial number.

17. A non-transitory computer readable memory medium according to claim 14, wherein the authenticating the device is based on a challenge response mechanism which employs the first authentication token to authenticate the device with the server.

18. A non-transitory computer readable memory medium according to claim 14, wherein the secure connection is an SSL connection.

19. A non-transitory computer readable memory medium according to claim 14, wherein the authenticating the server comprises:
   creating, by the server, a second authentication token;
   storing, by the server, the second authentication token;
   transferring, by the server, the second authentication token to the device using the secure connection; and
   storing, by the device, the second authentication token,
   wherein the server is authenticated using the second authentication token.

20. A device for authentication by a server over a network, the device comprising:
   a computer readable memory which stores computer executable process steps; and
   a processor constructed to execute the computer executable process steps stored in the memory;
   wherein the computer executable process steps comprise:
   establishing by the device a secure connection with the server;
   communicating identification information of the device to the server, wherein the identification information uniquely identifies the device to the server and is pre-stored in the device;
   receiving a first authentication token from the server, the first authentication token indicating that the device is credible;
   storing the first authentication token;
   establishing by the device a secure re-connection with the server; and
   authenticating the device to the server over the secure re-connection using the first authentication token stored by the device.

21. A device according to claim 20, wherein the identification information uniquely identifies the device to the server and includes a combination of plural identification data pre-stored in the device including device model number, a firmware revision, a Media Access Control (MAC) address, and a device serial number.

22. A server for authenticating a device over a network, the server comprising:
   a computer readable memory which stores computer executable process steps; and
   a processor constructed to execute the computer executable process steps stored in the memory;
   wherein the computer executable process steps comprise:
   establishing a secure connection between the device and the server;
   receiving identification information from the device, wherein the identification information uniquely identifies the device to the server and is pre-stored in the device;
   determining the credibility of the device using the identification information; and
   in a case where it is determined that the device is credible:
   creating a first authentication token for the device, the first authentication token indicating that the device is credible;
   storing the first authentication token; and
   transferring the first authentication token to the device using the secure connection;
   wherein the process steps further comprise:
   establishing a secure re-connection between the device and the server; and
   authenticating the device over the secure re-connection using the first authentication token stored by the device.

23. A method of authenticating a device with a server over a network, the method comprising the steps of:
   establishing, by the device, a secure connection with the server;
   communicating, by the device, identification information of the device to the server, wherein the identification information uniquely identifies the device to the server and is pre-stored in the device;
   determining, by the server, the credibility of the device using the identification information communicated by the device; and
   in a case where the server determines that the device is credible:
   creating, by the server, a first authentication token for the device, the first authentication token indicating that the device is credible;
   storing, by the server, the first authentication token;
   transferring, by the server, the first authentication token to the device using the secure connection; and
   storing, by the device, the first authentication token;
   wherein the method further comprises the steps of:
   establishing, by the device, a re-connection with the server; and
   authenticating, by the server and over the re-connection, the device using the first authentication token stored by the device.

24. A method according to claim 23, wherein the identification information comprises at least one of a device model number, a firmware revision, a Media Access Control (MAC) address, and a device serial number.

25. A non-transitory computer readable memory medium on which is stored computer executable process steps for causing a computer to authenticate a device with a server over a network, the process steps comprising:
   establishing, by the device, a secure connection with the server;
   communicating, by the device, identification information of the device to the server, wherein the identification information uniquely identifies the device to the server and is pre-stored in the device;
   determining, by the server, the credibility of the device using the identification information communicated by the device; and
   in a case where the server determines that the device is credible:
   creating, by the server, a first authentication token for the device, the first authentication token indicating that the device is credible;
   storing, by the server, the first authentication token;
   transferring, by the server, the first authentication token to the device using the secure connection; and
   storing, by the device, the first authentication token;
   wherein the process steps further comprise:
   establishing, by the device, a re-connection with the server; and authenticating, by the server and over the re-connection, the device using the first authentication token stored by the devices.

26. A non-transitory computer readable memory medium according to claim 25, wherein the identification information comprises at least one of a device model number, a firmware revision, a MAC address, and a device serial number.

27. A device for authentication by a server over a network, the device comprising:
- a computer readable memory which stores computer executable process steps; and
- a processor constructed to execute the computer executable process steps stored in the memory;
wherein the computer executable process steps comprise:
establishing by the device a secure connection with the server;
communicating identification information of the device to the server, wherein the identification information uniquely identifies the device to the server and is pre-stored in the device;
receiving a first authentication token from the server, the first authentication token indicating that the device is credible;
storing the first authentication token;
establishing by the device a re-connection with the server; and
authenticating the device to the server over the re-connection using the first authentication token stored by the device.

28. A device according to claim 27, wherein the identification information uniquely identifies the device to the server and includes a combination of plural identification data pre-stored in the device including device model number, a firmware revision, a Media Access Control (MAC) address, and a device serial number.

* * * * *